Oct. 7, 1941.  F. P. THOMAS ET AL  2,258,080
ARTIFICIAL BAIT
Filed April 26, 1940
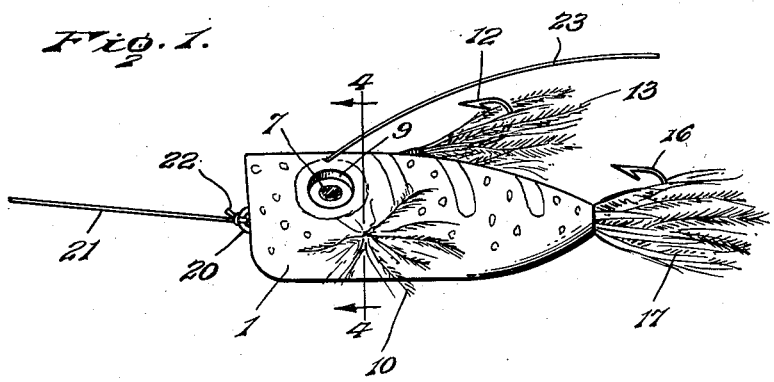
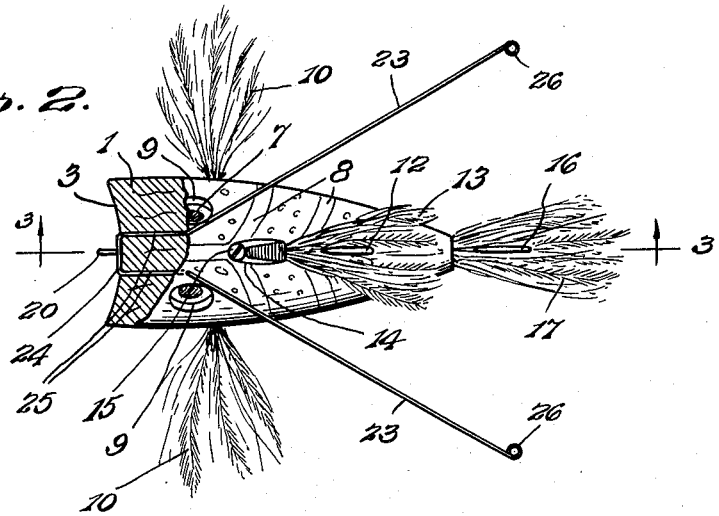
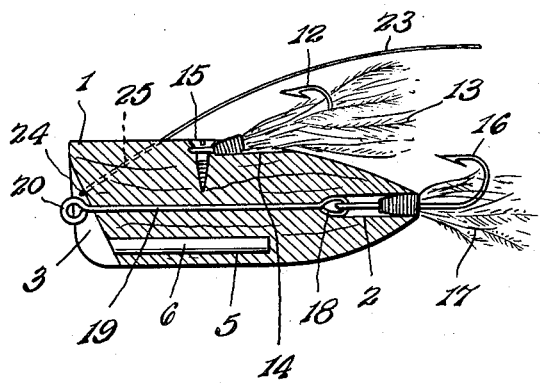
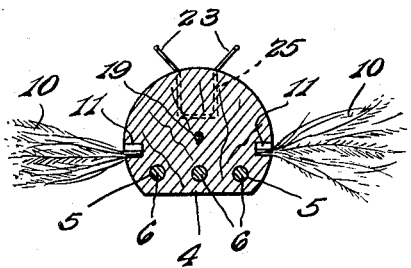
INVENTORS
F. P. Thomas.
F. B. Jennings.
BY
ATTORNEY Patented Oct. 7, 1941

2,258,080

UNITED STATES PATENT OFFICE 2,258,080

ARTIFICIAL BAIT

Frank P. Thomas, Hoquiam, and Frank B. Jennings, Olympia, Wash.

Application April 26, 1940, Serial No. 331,856

5 Claims. (Cl. 43—46)

This invention relates to an artificial bait of the plug type and has as one object to provide a lure or artificial bait which will be very effective for catching bull frogs but is not necessarily limited to such fishing as it may also be used as bait for fish.

Another object of the invention is to provide an artificial bait so formed that it will float and may be drawn along the surface of water and serve very effectively to attract bull frogs.

Another object of the invention is to provide a bait of the plug type having a buoyant body carrying tufts which closely resemble the fins and tail of a fish when the bait is drawn through water, certain of these tufts serving to conceal hooks by means of which a frog is caught after taking the bait.

Another object of the invention is to provide the bait with a longitudinally extending strand so mounted in the body thereof that it serves as a carrier for a rear hook and has its front end formed with a loop which serves to prevent the strand from slipping rearwardly through the body and also constitutes an eye to which a line is to be tied.

Another object of the invention is to provide the body with improved balancing weights so applied that they will maintain the body in its proper position and prevent it from tilting transversely and turning over in the water when the bait is in use.

Another object of the invention is to provide a bait having weed guards so mounted that they will be firmly held to the body and project upwardly and rearwardly in position to prevent weeds from catching on the hooks.

The invention is illustrated in the accompanying drawing, wherein:

Figure 1 is a side elevation of the improved bait.

Figure 2 is a top plan view with the forward portion of the body in section.

Figure 3 is a sectional view taken longitudinally through the bait on the line 3—3 of Figure 2.

Figure 4 is a sectional view taken transversely through the bait on the line 4—4 of Figure 1.

This improved artificial bait is primarily intended for use as a lure for bull frogs but it is to be understood that it may be used for game fish of various kinds. The body 1 of the bait is formed of wood or other buoyant material and tapers from its front end toward its rear end, where it is formed with a longitudinally extending pocket 2. At its front end the body is concaved to form a transversely arcuate front face 3 which extends downwardly at a rearward incline, as shown in Figure 3. Referring to Figure 4, it will be seen that the body is circular in cross section except for its under portion which is shaped to provide a flat lower face or bottom 4. The body is bored from its front end, as shown in Figs. 3 and 4, to provide bores 5 extending longitudinally of the body in transverse spaced relation to each other adjacent the bottom 4 and in these bores fit metal rods constituting weights 6 which have tight wedging fit and serve to prevent transverse tilting of the body and maintain it in its proper position as it is drawn through the water. The location of the weights is important as by having them below the longitudinal axis of the body they cause the body to have the proper draft and their distribution transversely of the body prevents transversely tilting. The surface of the body is painted to prevent the wooden body from becoming water logged and also to simulate the appearance of a fish, the eyes being shown at 7 and other markings at 8. It should be noted that portions of the body surrounding the eyes are punched or bored inwardly, as shown at 9, to impart a more realistic appearance to the eyes and eye sockets.

In order to represent side fins or wings, there have been provided tufts of feathers or hair 10 which are secured by pins or wedges 11 driven into opposite sides of the body. A hook 12 carrying feathers or hair 13 and constituting a fly hook, is mounted in a recess 14 at the top of the body midway the width thereof by a screw or brad 15 and it should be noted that the hook extends upwardly from the body with its barb presented forwardly. There has also been provided a rear hook 16 carrying a tuft of feathers or hair 17. This rear fly hook has its shank extending into the pocket 2 and engaged with the eye 18 formed at the rear end of a strand of stiff wire 19. This strand 19 is of sufficient length to project forwardly from the front face 3 of the body and, after the strand has been drawn forwardly to the position shown in Fig. 3, the protruding end thereof is bent to form an eye 20. The eye 20 serves to prevent the wire strand from slipping rearwardly through the body and, in addition, serves its purpose as an eye to which a line 21 is tied, as shown at 22 in Fig. 1. It will thus be seen that the bait may be drawn through the water and, since the body is provided with fins, and a tail, it will very effectively simulate a fish swimming and a frog seeing the same will take the bait and become caught by the hooks 12 and 16.

Weed guards 23 extend rearwardly at an upward incline from the forward portion of the body. These weed guards are formed from a strand of thin resilient wire which has its midportion bent to form a bridge 24 having arms 25 extending therefrom. The arms are threaded through small openings formed in the body at an upwardly incline from the front face 3 and after the bridge 24 has been brought into close contacting engagement with the front face, the portions of the arms which protrude rearwardly from the top of the body and form the guards 23 are bent so that they diverge from each other transversely of the body and project from opposite sides thereof beyond the tufts of feathers 10. Ends of the guards are bent to form small eyes providing the guards with blunt tips 26. These guards serve to prevent the hooks from catching in grass and other weeds in the water through which the bait is drawn. The curled ends 26 prevent a frog from being stabbed and injured in his attack from above as he jumps on the lure.

Having thus described the invention what is claimed is:

1. An artificial bait comprising a buoyant body tapered toward its rear end and formed with an axially extending pocket leading from its rear end, a hook at the rear of said body having a shank extending into said pocket and formed with an eye at its front end, a metal strand extending longitudinally through the body axially thereof with its rear end formed with an eye engaged with the eye of said hook and its front end protruding from the body and formed with an eye bearing against the front end of the body to hold the strand in place and provide line engaging means, and metal rods extending longitudinally in the forward portion of the body adjacent the bottom thereof and spaced from each other transversely of the body and constituting ballast for the body.

2. An artificial bait comprising a buoyant body tapered toward its rear end and having a flat bottom face, the front face being transversely concaved and extending downwardly at a rearward incline, a strand extending longitudinally through the body axially thereof and having a line engaging eye at its front end abutting the front face of the body, a hook at the rear of the body connected with the rear end of said strand, and weights extending longitudinally in the forward portion of said body intermediate the strand and the flat bottom of the body and spaced from each other transversely of the body.

3. An artificial bait comprising a buoyant body tapered toward its rear end and having a front face, weight means extending longitudinally in the forward portion of said body adjacent the bottom thereof, a hook at the rear end of said body, a strand carrying said hook extending longitudinally through the body and formed with a line engaging eye at its front end projecting from the front face of the body, an upper hook extending longitudinally of said body intermediate the length thereof, and a strand of thin resilient wire bent to form a bridge and arms extending rearwardly therefrom, said arms extending rearwardly through the forward portion of the body at an upward incline with the bridge abutting the front face of the body over said eye and portions of the arms projecting upwardly and rearwardly from the top of the body and diverging transversely from the body to provide weed guards.

4. An artificial bait comprising a buoyant body having a front face, weight means extending longitudinally in the forward portion of said body adjacent the bottom thereof, a hook at the rear end of said body, a strand carrying said hook extending longitudinally through the body above the weight means and having a line engaging eye at its front end, an upper hook intermediate the length thereof, and strands of resilient wire anchored at the front end of the body and extending rearwardly and upwardly through the forward portion of the body with portions of the strands projecting upwardly and rearwardly from the top of the body and diverging transversely at opposite side of the upper hook to provide weed guards.

5. An artificial bait comprising a buoyant body, a fly hook at the rear end of said body, a line engaging eye at the front of said body, a fly hook mounted at the top of said body substantially midway the length thereof and extending rearwardly thereof with its barb presented forwardly, resilient weed guards threaded through the forward portion of the body and extending from the upper portion of the body in spaced relation to the front end thereof with the upper hook disposed between the weed guards, and portions of the guards projecting from opposite sides of the body at a rearward incline.

FRANK P. THOMAS.
FRANK B. JENNINGS.